United States Patent
Raman et al.

(10) Patent No.: US 12,425,723 B2
(45) Date of Patent: Sep. 23, 2025

(54) NETWORK SURVEILLANCE CAMERA SYSTEM AND METHOD FOR OPERATING SAME

(71) Applicant: HANWHA VISION CO., LTD., Seongnam-Si (KR)

(72) Inventors: Sujith Raman, Seongnam-Si (KR); Hyun Ho Kim, Seongnam-Si (KR); Kyungduk Kim, Seongnam-Si (KR); Ilhwang Cha, Seongnam-Si (KR); Jaeyoung Shin, Seongnam-Si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 268 days.

(21) Appl. No.: 17/611,447

(22) PCT Filed: Jun. 4, 2020

(86) PCT No.: PCT/KR2020/007272
§ 371 (c)(1),
(2) Date: Nov. 15, 2021

(87) PCT Pub. No.: WO2020/246823
PCT Pub. Date: Dec. 10, 2020

(65) Prior Publication Data
US 2022/0239826 A1    Jul. 28, 2022

Related U.S. Application Data

(60) Provisional application No. 62/857,106, filed on Jun. 4, 2019.

(30) Foreign Application Priority Data

Nov. 11, 2019    (KR) .......................... 10-2019-0143648

(51) Int. Cl.
*H04N 23/661*    (2023.01)
*G06T 7/11*    (2017.01)
(Continued)

(52) U.S. Cl.
CPC ............. *H04N 23/661* (2023.01); *G06T 7/11* (2017.01); *G06V 20/52* (2022.01);
(Continued)

(58) Field of Classification Search
CPC ............... H04N 23/661; H04N 21/235; H04N 21/6437; H04N 21/4223; H04N 21/44008;
(Continued)

(56) References Cited

U.S. PATENT DOCUMENTS 9,918,045 B1    3/2018    Moss et al.
11,030,728 B2 *    6/2021    Samadani .......... H04N 1/32101
(Continued)

FOREIGN PATENT DOCUMENTS

CN    108989753 A    12/2018
CN    109479117 A    3/2019
(Continued)

OTHER PUBLICATIONS

International Search Report (PCT/ISA/210) dated Sep. 9, 2020 issued by the International Searching Authority in International Application No. PCT/KR2020/007272.
(Continued)

*Primary Examiner* — Nathan J Flynn
*Assistant Examiner* — Christine A Kurien
(74) *Attorney, Agent, or Firm* — McLean IP Global; Jason Y. Pahng (57)    ABSTRACT

Provided is a network surveillance camera system. The system comprises a camera for photographing a surveillance region to acquire video and audio signals for the surveillance
(Continued)

region, and a video receiving device connected to the camera through network for receiving data from the camera in real time, wherein the camera comprises a metadata generation unit for generating video analysis information corresponding to the surveillance region as text-based metadata, and a still image generation unit for generating a still image by cropping a video portion corresponding to an identifiable object detected within the surveillance region from among the video analysis information.

20 Claims, 9 Drawing Sheets

(51) Int. Cl.
  *G06V 20/52* (2022.01)
  *G08B 13/196* (2006.01)
  *H04N 21/235* (2011.01)
  *H04N 21/6437* (2011.01)
(52) U.S. Cl.
  CPC ..... *G08B 13/19656* (2013.01); *H04N 21/235* (2013.01); *H04N 21/6437* (2013.01)
(58) Field of Classification Search
  CPC ........... H04N 21/8153; H04N 21/8405; H04N 23/617; H04N 7/18; H04N 23/60; H04N 21/2343; H04N 21/8543; G06T 7/11; G06V 20/52; G06V 10/98; G08B 13/19656; G08B 13/19671
  See application file for complete search history.

(56) References Cited

U.S. PATENT DOCUMENTS

| | | | |
|---|---|---|---|
| 2009/0164655 A1* | 6/2009 | Pettersson | H04L 65/65 709/231 |
| 2014/0333776 A1* | 11/2014 | Dedeoglu | H04N 21/44008 348/159 |
| 2017/0346863 A1 | 11/2017 | Faulkner et al. | |
| 2018/0113577 A1* | 4/2018 | Burns | G11B 27/3081 |

FOREIGN PATENT DOCUMENTS

| | | |
|---|---|---|
| JP | 2014131211 A | 7/2014 |
| JP | 6261815 B1 | 1/2018 |
| KR | 10-2013-0056749 A | 5/2013 |
| KR | 10-1470315 B1 | 12/2014 |
| KR | 10-1698864 B1 | 1/2017 |
| KR | 10-1921868 B1 | 11/2018 |
| KR | 10-2019-0013748 A | 2/2019 |
| KR | 101942491 B1 | 4/2019 |

OTHER PUBLICATIONS

Written Opinion (PCT/ISA/237) dated Sep. 9, 2020 issued by the International Searching Authority in International Application No. PCT/KR2020/007272.

Office Action dated Mar. 25, 2024, issued by Korean Patent Office in Korean Patent Application No. 10-2019-0143648.

* cited by examiner

```
<Client → Server: >
DESCRIBE rtsp://192.168.0.1 RTSP/1.0
Cseq: 1
User-Agent:Wisenet RTSP client
Accept: application/sdp
<Server → Client: >
RTSP/1.0 200 OK
Cseq: 1
Content-Type:application/sdp
Content-Length:XXX
a=control:rtsp://192.168.75.52:554/0/onvif/profile1/media.smp
a=range:npt=now
m=video40104 RTP/AVP 26
a=rtpmap:26JPEG/90000
a=control:rtsp://192.168.75.52:554/0/onvif/profile1/media.smp/trackID=v
m=application40106 RTP/AVP107
b=AS:8
a=rtpmap:107vnd.onvif.metadata/90000
a=control:rtsp://192.168.75.52:554/0/onvif/profile1/media.smp/trackID=m
a=recvonly
m=video40108 RTP/AVP 26
i=MetaImageSession
a=rtpmap:26JPEG/90000
a=control:rtsp://192.168.75.52:554/0/onvif/profile1/media.smp/trackID=Mi
a=recvonly
```

NETWORK SURVEILLANCE CAMERA SYSTEM AND METHOD FOR OPERATING SAME

This application claims the benefit of U.S. Patent Application No. 62/857,106, filed on Jun. 4, 2019, in the United States Patent and Trademark Office and the benefit of Korean Patent Application No. 10-2019-0143648, filed on Nov. 11, 2019, in the Korean Intellectual Property Office, the disclosure of which is incorporated herein by reference in its entirety.

BACKGROUND

1. Field

An embodiment of the present invention relates to a surveillance camera system, and more particularly, to a video surveillance system using a network camera and an operating method thereof.

2. Description of the Related Art

A recent surveillance camera system can transmit various video analysis information acquired in a surveillance region by using a network camera that performs intelligent video analysis together with image and audio signals.

In such a network-based surveillance camera system, media streaming using RTP/RTSP is widely used, and in a video receiving device such as a network camera, DVR (Digital Video Recorder), NVR (Network Video Recorder), and video surveillance standardization organizations such as ONVIF as well, a standard protocol is adapted for media streaming using RTP/RTSP.

RTSP (Real Time Streaming Protocol) is a standard communication protocol (RFC2326) developed by IETF and is used to remotely control the media server. In order to transmit media streaming data including video and audio, the RTP (Real-time Transport Protocol) is mainly used together as a transport layer.

SUMMARY

In an embodiment of the present invention, provided are a network surveillance camera system for, in transmitting a video and audio signal detected in a surveillance region of a network camera to a video receiving device, transmitting video analysis information of the surveillance region corresponding to the detected video and audio signal together with a still image for a specific analysis region among the video analysis information in real time, and a method of operating the same.

In addition, provided are a network surveillance camera system capable of transmitting the video analysis information implemented as text-based metadata by extending the existing RTP/RTSP streaming protocol and a still image for the specific analysis region in real time, and a method of operating the same.

In order to achieve the above object, a network surveillance camera system according to an embodiment of the present invention comprises a camera for photographing a surveillance region to acquire video and audio signals for the surveillance region; and a video receiving device connected to the camera through network for receiving data from the camera in real time, wherein the camera comprises a metadata generation unit for generating video analysis information corresponding to the surveillance region as text-based metadata; and a still image generation unit for generating a still image by cropping a video portion corresponding to an identifiable object detected within the surveillance region from among the video analysis information.

Wherein real time transmission of the data may be implemented by an RTP/RTSP streaming protocol.

Wherein an RTP header of the data transmitted in real time may include an RTP fixed header and an RTP extension header, and the RTP extension header may include an extension header ID and an object ID for the detected object.

Wherein the object ID may be an identifier of a video analysis object described in the metadata.

Wherein the RTP extension header may further include an extension field including coordinate information, at which the detected object is located in a corresponding original video region, and/or attribute information indicating an attribute of the detected object.

Wherein the metadata may include detection information, identification information, and location information of an object photographed in the surveillance region. Wherein the still image may be selected as a still image capable of recognizing a specific object among video data photographed in the surveillance region, and the still image may be implemented as a JPEG image file.

Wherein the video receiving device may generate a thumbnail image by using the still image.

The method of operating a network surveillance camera system according to an embodiment of the present invention comprises acquiring a video/audio signal for a surveillance region by photographing the surveillance region; generating video analysis information corresponding to the surveillance region as text-based metadata; generating a still image by cropping a video portion corresponding to an identifiable object detected within the surveillance region among the video analysis information; transmitting the video/audio signal, metadata, and still image in real time by an RTP/RTSP streaming protocol; and monitoring the surveillance region by receiving the video/audio signal, metadata, and still image.

Wherein generation of the metadata and the still image may be performed by adding a tag requesting generation of the metadata and the still image when a RTSP DESCRIBE instruction is transmitted.

Wherein an RTP header of the data transmitted in real time may include an RTP fixed header and an RTP extension header, and the RTP extension header may include an extension header ID and an object ID for the detected object.

Wherein the object ID may be an identifier of a video analysis object described in the metadata.

Wherein the RTP extension header may further include an extension field including coordinate information, at which the detected object is located in a corresponding original video region, and/or an attribute information indicating an attribute of the detected object.

Wherein the metadata may include detection information, identification information, and location information of an object photographed in the surveillance region.

Wherein the still image may be selected as a still image capable of recognizing a specific object among video data photographed in the surveillance region, and the still image may be implemented as a JPEG image file.

The step of generating a thumbnail image by using the still image may be further included.

According to this embodiment of the present invention, by providing a still image of an identifiable specific region among the video analysis information for the surveillance region, the video data of the surveillance region can be more quickly and accurately searched by using the image information without a client such as a video receiving device performing a separate video decoding procedure.

In addition, when a client requests a video through the RTP/RTSP streaming protocol, in addition to the video/audio signal for the surveillance region, the video analysis information implemented as text-based metadata by extending the existing RTP/RTSP streaming protocol and still images for the specific analysis region can be transmitted in real time.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The above contents described in the background of the present invention are only for helping the understanding of the background of the technical idea of the present invention, and therefore it cannot be understood as content corresponding to the prior art known to those skilled in the art of the present invention.

In the following description, for purposes of explanation, numerous specific details are set forth to aid understanding of various embodiments. It will be evident, however, that various embodiments may be practiced without these specific details or in one or more equivalent manners. In other instances, well-known structures and devices are shown in block diagram in order to avoid unnecessarily obscuring the various embodiments.

Since each block of the accompanying block diagram may be executed by computer program instructions (execution engine), and these computer program instructions may be loaded on the processor of a general-purpose computer, special-purpose computer, or other programmable data processing equipment, the instructions executed by the processor of a computer or other programmable data processing equipment will generate means for performing the functions described in each block of the block diagram.

These computer program instructions may also be stored in a computer-usable or computer-readable memory which may direct a computer or other programmable data processing equipment to implement a function in a particular manner, and thus it is also possible that the instructions stored in the computer-usable or computer-readable memory are produced as an article of manufacture containing instruction means for performing the functions described in each block of the block diagram.

And, since the computer program instructions may be mounted on a computer or other programmable data processing equipment, a series of operational steps may be performed on the computer or other programmable data processing equipment to generate a computer-executed process so that the instructions for executing a computer or other programmable data processing equipment may provide function for performing the functions described in each block of the block diagram.

Additionally, each block may represent a part of a module, segment, or code including one or more executable instructions for executing specified logical functions, and in some alternative embodiments, it is also possible for functions described in the blocks or steps to occur out of sequence.

That is, the two illustrated blocks may be substantially simultaneously performed, and the blocks may also be performed in the reverse order of the corresponding functions, if necessary.

The terminology used herein is for the purpose of describing particular embodiments and not for the purpose of limitation. Throughout the specification, when a part "includes" a certain component, it means that other components may be further included, rather than excluding other components, unless otherwise stated. Unless otherwise defined, terms used herein have the same meaning as commonly understood by those skilled in the art, to which this invention belongs.

Hereinafter, embodiments of the present invention will be described in more detail with reference to the accompanying drawings.

Figure 1:
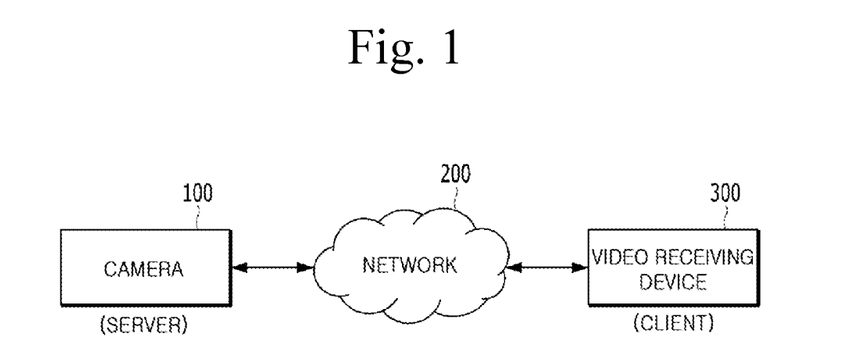
FIG. 1 is a block diagram schematically showing the configuration of a network surveillance camera system according to an embodiment of the present invention.

FIG. 1 is a block diagram schematically showing the configuration of a network surveillance camera system according to an embodiment of the present invention.

Referring to FIG. 1, a network surveillance camera system according to an embodiment of the present invention comprises a camera 100, network 200, and a video receiving device 300, and has the configuration in that data of the camera 100 is transmitted to the video receiving device 300 through the network 200, and an administrator can monitor the data transmitted from the camera 100 using the video receiving device 300. That is, in the embodiment of the present invention, the camera 100 may serve as a server transmitting data, and the video receiving device 300 may serve as a client receiving the transmitted data.

The camera 100 photographs the surveillance region to acquire video and audio signals for the surveillance region, which may photograph the surveillance region in real time for the purpose of surveillance or security.

The camera 100 can be implemented as a PTZ camera capable of panning and tilting and adjusting the zoom magnification of the lens, and the camera 100 may be implemented as a network camera that performs an intelligent video analysis function. Accordingly, the camera 100 according to the embodiment of the present invention may generate the video analysis information corresponding to the surveillance region in the form of text-based metadata. For example, the metadata may be written in an XML format.

The metadata may include object detection information (movement, sound, intrusion into a designated area, etc.) and object identification information (person, car, face, hat, clothes, etc.) photographed in the surveillance region, and detected location information (coordinates, size, etc.), and such metadata is transmitted to the video receiving device 300 through the network 200 in real time together with the video and audio signals detected in the surveillance region, and is used for real-time control and video search. Therefore, it can be used to increase control convenience and search efficiency.

The camera 200 according to an embodiment of the present invention generates the text-based metadata and captures a still image for a specific analysis region among the video analysis information, and transmits it together in real time. For example, the still image may be implemented as a JPEG image file.

The camera 100 may transmit information to the video receiving device 300 using various wired and wireless communication methods such as Ethernet, Wi-Fi, and Bluetooth, and may receive an instruction from the video receiving device 300.

The network 200 may encompass, for example, a wired network such as LANs (Local Area Networks), WANs (Wide Area Networks), MANs (Metropolitan Area Networks), ISDNs (Integrated Service Digital Networks), or a wireless network such as wireless LANs, CDMA, Bluetooth, satellite communication, but the scope of the present invention is not limited thereto.

The video receiving device 300 may receive and store data transmitted from the camera 200, and perform an operation of analyzing and monitoring it. Accordingly, the video receiving device 300 may be implemented as a DVR (Digital Video Recorder), a NVR (Network Video Recorder), a VMS (Video Management System), or the like, or as an application installed in a mobile terminal.

Figure 2:
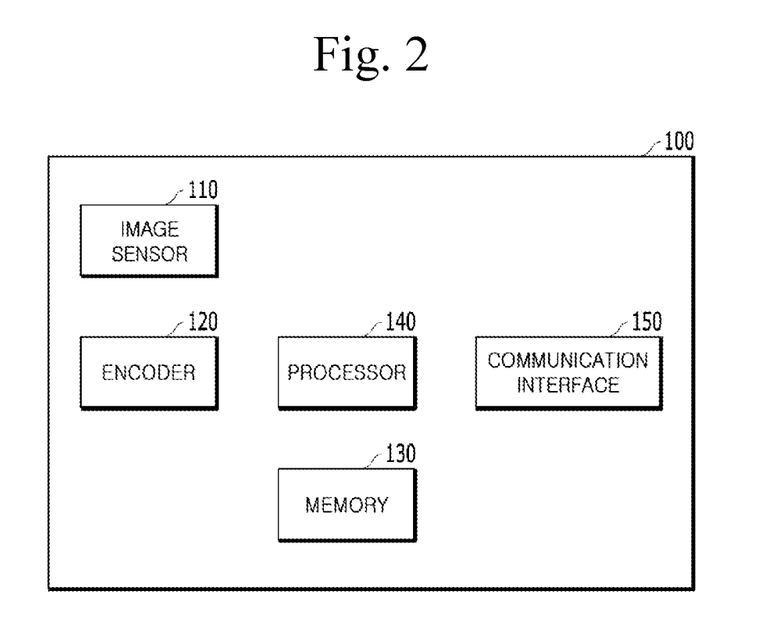
FIG. 2 is a block diagram showing the configuration of the camera shown in FIG. 1.
Figure 3:
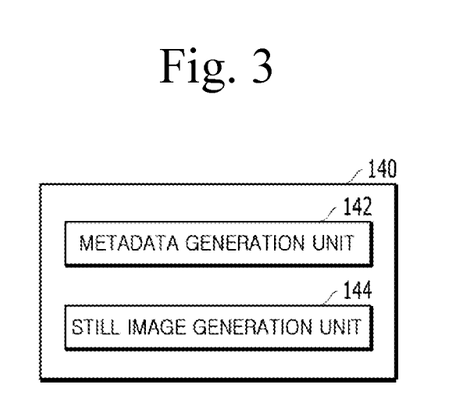
FIG. 3 is a block diagram showing an embodiment of the internal configuration of the processor shown in FIG. 2.

FIG. 2 is a block diagram showing the configuration of the camera shown in FIG. 1, and FIG. 3 is a block diagram showing an embodiment of the internal configuration of the processor shown in FIG. 2.

Referring first to FIG. 2, the camera 100 includes an image sensor 110, an encoder 120, a memory 130, an event sensor 140, a processor 140, and a communication interface 150.

The image sensor 110 performs a function of acquiring a video by photographing a surveillance region, and may be implemented with, for example, a CCD (Charge-Coupled Device) sensor, a CMOS (Complementary Metal-Oxide-Semiconductor) sensor, etc.

The encoder 120 performs an operation of encoding the video acquired through the image sensor 110 into a digital signal, and it may follow, for example, H.264, H.265, MPEG (Moving Picture Experts Group), M-JPEG (Motion Joint Photographic Experts Group) standards or the like.

The memory 130 may store video data, audio data, still images, metadata, and the like. As mentioned above, the metadata may be text-based data including object detection information (movement, sound, intrusion into a designated area, etc.) and object identification information (person, car, face, hat, clothes, etc.) photographed in the surveillance region, and a detected location information (coordinates, size, etc.).

In addition, the still image is generated together with the text-based metadata and stored in the memory 130, and it may be generated by capturing image information for a specific analysis region among the video analysis information. For example, the still image may be implemented as a JPEG image file.

For example, the still image may be generated by cropping a specific region of the video data determined to be an identifiable object among the video data of the surveillance region detected for a specific region and a specific period, and it may be transmitted in real time together with the text-based metadata. In this case, the metadata may be written in XML format.

The communication interface 150 transmits the video data, audio data, still image, and/or metadata to the video receiving device 300. The communication interface 150 according to an embodiment may transmit video data, audio data, still images, and/or metadata to the video receiving device 300 in real time. The communication interface 150 may perform at least one communication function among wired and wireless LAN (Local Area Network), Wi-Fi, ZigBee, Bluetooth, and Near Field Communication.

The processor 140 controls the overall operation of the camera 100, which may be configured to process instructions of a computer program by performing basic arithmetic, logic, and input/output operations. Instructions may be provided to processor 140 by memory 130 or communication interface 150. For example, the processor 140 may be configured to execute a received instruction according to a program code stored in a recording device such as the memory 130. That is, the processor 140 may include a program module that is implemented by software such as C, C++, Java, Visual Basic, Visual C, and the like and performs various functions.

Referring to FIG. 3, the processor 140 of the network camera 200 according to the embodiment of the present invention may include a metadata generation unit 142 and a still image generation unit 144.

Here, the processor 140 may be implemented to execute an instruction according to the code of the operating system and at least one program code included in the memory 130, in this case, it can be understood that the components in the processor 140, that is, the metadata generation unit 142 and the still image generation unit 144 distinguish and express different functions performed by the processor 140 according to a control instruction provided by a program code stored in the camera 200.

The metadata generation unit 142 performs a function of generating video analysis information corresponding to the surveillance region of the camera in the form of text-based metadata. The metadata may include object detection information (movement, sound, invasion of a designated area, etc.) and object identification information (person, car, face, hat, clothes, etc.) photographed in the surveillance region, and detected location information (coordinates, size, etc.), and such metadata is transmitted to the video receiving device 300 through the network 200 in real time together with the video and audio signals detected in the surveillance region, and can be used for real-time control and video search. Therefore, it can be used to increase control convenience and search efficiency.

The processor 140 of the camera 200 according to an embodiment of the present invention may generate the text-based metadata, and capture and generate a still image for a specific analysis region among the video analysis information through the still image generation unit 144. Further, the still image generated by the still image generating unit 144 may be stored in the memory 130.

For example, the still image may be generated by cropping a specific region of the video data determined to be an identifiable object among the video data of the surveillance region detected for a specific region and a specific period.

More specifically, the still image may be a still image generated by cropping a specific region, that is, the video portion corresponding to an identifiable object detected within the surveillance region, among the video analysis information corresponding to the surveillance region written in the text-based metadata.

That is, it may be selected as a "best shot" still image that can recognize a specific object best among the video data photographed in the surveillance region, and it can be transmitted in real time together with the text-based metadata. Accordingly, a client such as the video receiving device 300 may use the still image as a thumbnail image when searching for video data transmitted without performing separate video processing, e.g., decoding.

Figure 4:
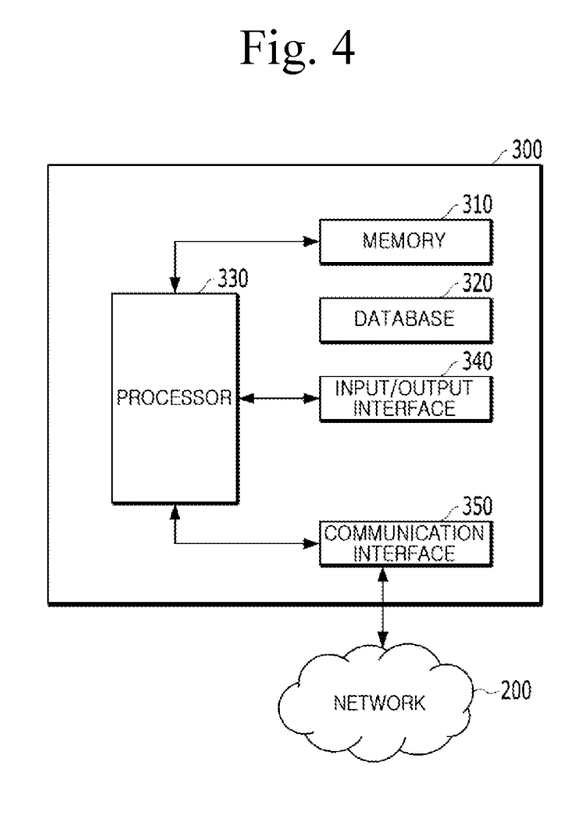
FIG. 4 is a block diagram showing the configuration of the video receiving device shown in FIG. 1.
Figure 5:
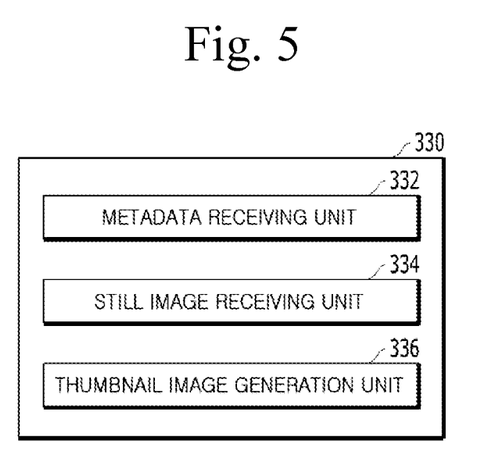
FIG. 5 is a block diagram showing an embodiment of the internal configuration of the processor shown in FIG. 4.

FIG. 4 is a block diagram showing the configuration of the video receiving device shown in FIG. 1, and FIG. 5 is a block diagram showing an embodiment of the internal configuration of the processor shown in FIG. 4.

The video receiving device 300 may receive and store data transmitted from the camera 200, and perform the role of a client to analyze and monitor it. For example, the video receiving device 300 may be implemented as a DVR (Digital Video Recorder), a NVR (Network Video Recorder), a VMS (Video Management System), or the like, or as an application installed in a mobile terminal.

Referring to FIG. 4, Referring to FIG. 5, a video receiving device 300 according to an embodiment of the present invention includes a memory 310, a database 320, a processor 330, a communication module 350, and an input/output interface 340.

The memory 310 is a computer-readable recording medium, and may include a non-volatile mass storage device such as a RAM, a ROM, and a disk drive. The memory 310 may store signals transmitted from the camera 100 shown in FIG. 1, for example, video data, audio data, still images, metadata, and the like corresponding to the surveillance region of the camera.

The database 320 may store and maintain unique information (e.g., camera ID, etc.) of the camera 100 illustrated in FIG. 1. That is, when the surveillance cameras connected to the video receiving device 300 are added and/or changed, information corresponding thereto may also be updated in the database 320.

The processor 330 may be configured to process instructions of a computer program by performing basic arithmetic, logic, and input/output operations. The instruction may be provided to the processor 330 by the memory 310 or the communication module 350. For example, the processor 330 may be configured to execute a received instruction according to a program code stored in a recording device such as the memory 310. That is, the processor 330 may include a program module that is implemented by software such as C, C++, Java, Visual Basic, Visual C, and the like and performs various functions.

The communication module 350 may provide a function to communicate with the camera 100 through the network 200. For example, a control signal, instruction, etc. provided under the control of the processor 330 of the video receiving device 300 may be transmitted to the camera 100 through the network 200 through the communication module 350. Similarly, the photographed video information and/or location information generated by the camera 100 may be transmitted to the video receiving device 300 via the network 200.

The input/output interface 340 may serve to provide an interface between an input device implemented as a keyboard or mouse and an output device such as a display.

Referring to FIG. 5, the processor 330 of the video receiving device 300 according to the embodiment of the present invention may include a metadata receiving unit 332, a still image receiving unit 334, and a thumbnail image generation unit 336.

Here, the processor 330 may be implemented to execute an instruction according to the code of the operating system and at least one program code included in the memory 310, at this time, it can also be understood the components in the processor 330, that is, the metadata receiving unit 332, the still image receiving unit 334, and the thumbnail image generation unit 336 distinguish and express the different functions performed by the processor 330 according to a control instruction provided by a program code stored in the video receiving device 300.

The metadata receiving unit 332 is a functional block corresponding to the metadata generation unit 142, which is a functional block in the processor 140 of the camera 200 described in FIG. 3, and performs the function of receiving the text-based metadata generated and transmitted by the metadata generation unit 142. For example, the metadata may be written in an XML format.

The metadata may include object detection information (movement, sound, intrusion into a designated area, etc.) and object identification information (person, car, face, hat, clothes, etc.) photographed in the surveillance region, and detected location information (coordinates, size, etc.), and such metadata is transmitted to the video receiving device 300 through the network 200 in real time together with the video and audio signals detected in the surveillance region, and used for real-time control and video search. Therefore, it can be used to increase control convenience and search efficiency.

Similarly, the still image receiving unit 334 is a functional block corresponding to the still image generation unit 144, which is a functional block in the processor 140 of the camera 200 described with reference to FIG. 3, and performs a function of receiving the still image generated and transmitted by the still image generation unit 144. For example, the still image may be generated by cropping a specific region of the video data determined to be an identifiable object among the video data of the surveillance region detected for a specific region and a specific period. More specifically, the still image may be a still image generated by cropping a specific region, that is, the video portion corresponding to an identifiable object detected within the surveillance region, among the video analysis information corresponding to the surveillance region written in the text-based metadata. That is, it may be selected as a "best shot" still image capable of recognizing a specific object best among the video data photographed in the surveillance region.

The thumbnail image generation unit 336 performs the function of generating a thumbnail image using the still image received through the still image receiving unit 334 when searching for video data corresponding to the surveillance region transmitted from the camera 200.

That is, a client such as a video receiving device generates the still image as a thumbnail image and displays it, so that the image can be utilized when playing back the transmitted video data of the surveillance region. More specifically, the client may display the video analysis information transmitted in the form of text-based metadata received through the metadata receiving unit 332 based on the surveillance region, and display the "best shot" still image corresponding to the metadata information as a thumbnail image.

Through this, the client, such as a video receiving device, can efficiently use the client's resources by using the still image as the thumbnail image without performing a separate video decoding procedure, and as a result, the video data in the surveillance region can be more quickly and accurately searched.

Figure 6:
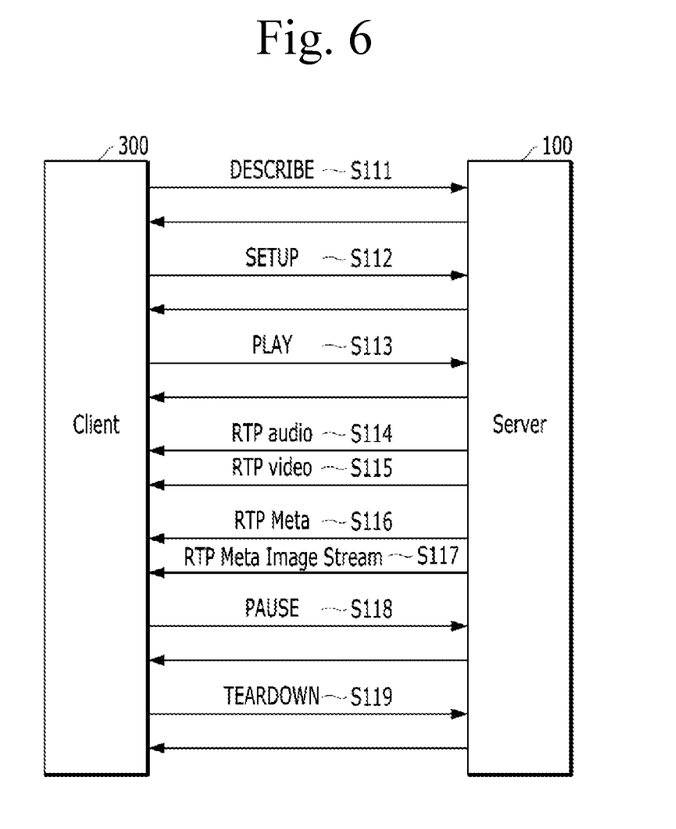
FIG. 6 is a view showing an embodiment of performing real-time video streaming between a client and a server using the RTP standard.
Figure 7:
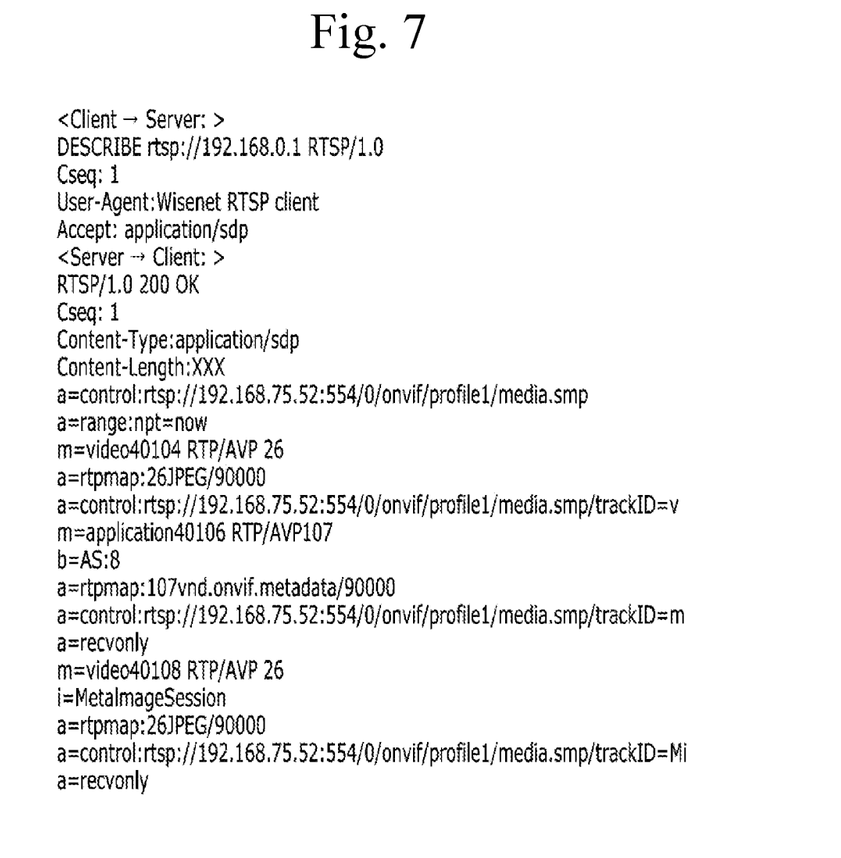
FIG. 7 is a diagram showing an example of media information responding between a client and a server through RTPS DESCRIBE in a network surveillance camera system according to an embodiment of the present invention.

FIG. 6 is a view showing an embodiment of performing real-time video streaming between a client and a server in an RTP standard, and FIG. 7 is a diagram showing an example of media information responding between a client and a server through RTPS DESCRIBE in a network surveillance camera system according to an embodiment of the present invention.

In FIGS. 6 and 7, the RTP/RTSP streaming protocol is described as an example as a means for implementing real-time video streaming according to an embodiment of the present invention, but the real-time video streaming according to an embodiment of the present invention is not limited thereto.

As mentioned above, in the embodiment of the present invention, the camera 100 may serve as a server for transmitting data, and the video receiving device 300 may serve as a client for receiving the transmitted data.

Referring to FIG. 6, according to the RTSP protocol, in order to receive media data, the following procedure should be preceded. The RTSP address of the server 100 is obtained in the client 300. In the client 300, the step of obtaining the media type provided by the server 100 through the DESCRIBE instruction (S111), the step of requesting the media provided by the server 100 through the SETUP instruction (S112), the step of initializing an RTP session according to each media type in response to the SETUP (S112), the step of determining and requesting media playback, playback speed, and playback time through the PLAY instruction (S113, S114, S115), the step of temporarily stopping media transmission through the PAUSE instruction (S118) and the step of terminating the RTSP session through the TEARDOWN instruction (S119) are included. In order to perform real-time video streaming in the RTP standard between the client 300 and the server 100, the step of retrieving the information of the media type provided by the server 100 through the DESCRIBE instruction (S111) and the step of initializing the RTP session for each media type provided by the server 100 through the SETUP (S112) should be sequentially performed.

As shown in FIG. 6, the embodiment of the present invention further includes the step of determining and requesting media playback, playback speed, and playback time through the PLAY instruction (S113, S114, S115), the step of transmitting metadata (RTP Meta) (S116) and the step of transmitting a still image (RTP Meta Image Stream) (S117).

Referring to FIG. 7, this describes an example of the RTPS DESCRIBE response exchanged by the camera 100 for transmitting a still image in real time and the video receiving device 300 for receiving it in the relationship between the server and the client, respectively. As such, in the step of the client sending the RTSP DESCRIBE instruction to the server, a tag requesting generation of the metadata and still image, that is, a Require: Best Shot tag as shown as an example is added and transmitted. In this case, the RTSP server (e.g., the camera 100) that provides the above-described still image (e.g., Best Shot) generation and provision function may respond to the RTSP DESCRIBE instruction including the Require: Best Shot tag by displaying information in the meta image session, and accordingly, metadata and still images as well as video signals and audio signals (VIDEO+AUDIO+METADATA+JPEG still images) can be transmitted to the client (e.g., the video receiving device 300).

As another embodiment, when the client does not add the Require: Best Shot tag in the step of sending the RTSP DESCRIBE instruction to the server, same as before, the RTSP server (e.g., camera 100) may regard it as a client that does not support the meta image session, and transmit only the video signal and the audio signal excluding the metadata and the still image to the client (e.g., the video receiving device 300).

Figure 8:
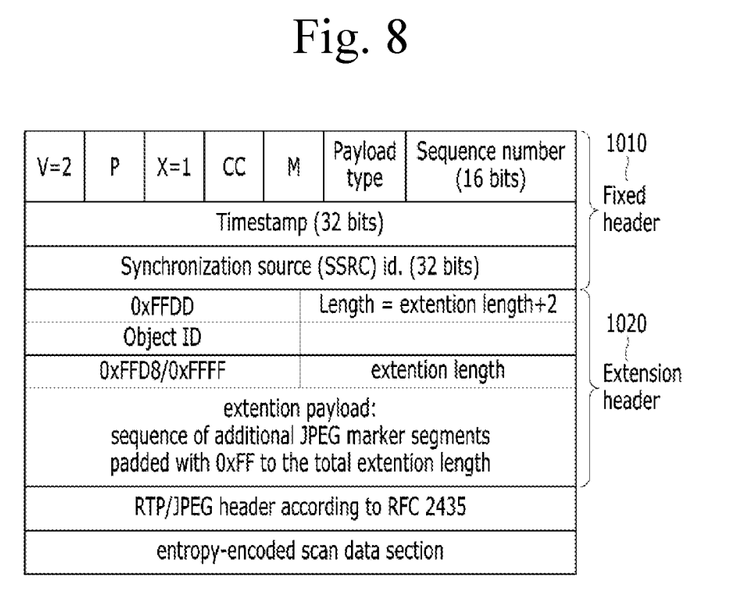
FIG. 8 is a view showing an example of an RTP header used in video streaming according to an embodiment of the present invention.

FIG. 8 is a diagram illustrating an example of an RTP header used in video streaming according to an embodiment of the present invention.

The RTP header used in video streaming according to the embodiment of the present invention includes an RTP extension header 1020 in addition to an RTP fixed header 1010 conforming to the RTSP standard. In this case, the description method of the RTP extension header 1020 may follow the RTP standard (rfc3550). As a preferred embodiment of the present invention, the RTP extension header 1020 may include, for example, an extension header ID, an object ID, and an extension field including coordinate information (location) and attribute information of the object.

Referring to FIG. 8, the extension header ID is "0xFFDD," which is a header code for analyzing the still image syntax in the client. In addition, the object ID represents the identifier of the video analysis object described in the metadata written in XML.

Here, the still image and the metadata information, that is, the video analysis information, are related to each other (e.g., a mapping relationship of 1:1), and through the object ID field, the client can determine the still image (Best Shot) of an object detected in the metadata.

If the object ID is included in the RTP extension header 1020, the best shot still image of the detected object can be acquired, but there may be a problem in that it is difficult to infer the relationship between the best shot still image and the original video image only with the object ID information.

Accordingly, in the embodiment of the present invention, the RTP extension header 1020 may include not only an object ID, but also an extension field including coordinate information (location) and attribute information of the object.

Specifically, the coordinate information (location) included in the extension field may be coordinate value information (e.g., x, y, width, height), at which the detected object is located in the corresponding original video region.

As described above, when the coordinate information (location) is further included in the RTP extension header 1020 in addition to the object ID, a function in that the region, in which the detected object is captured, is overlaid without additional metadata, to display it on the original video region can be implemented.

Also. the attribute information included in the extension field is information indicating attributes of the detected object. For example, the attribute information may be defined as a vehicle, a person, a face, a license plate, and the like.

Figure 9:
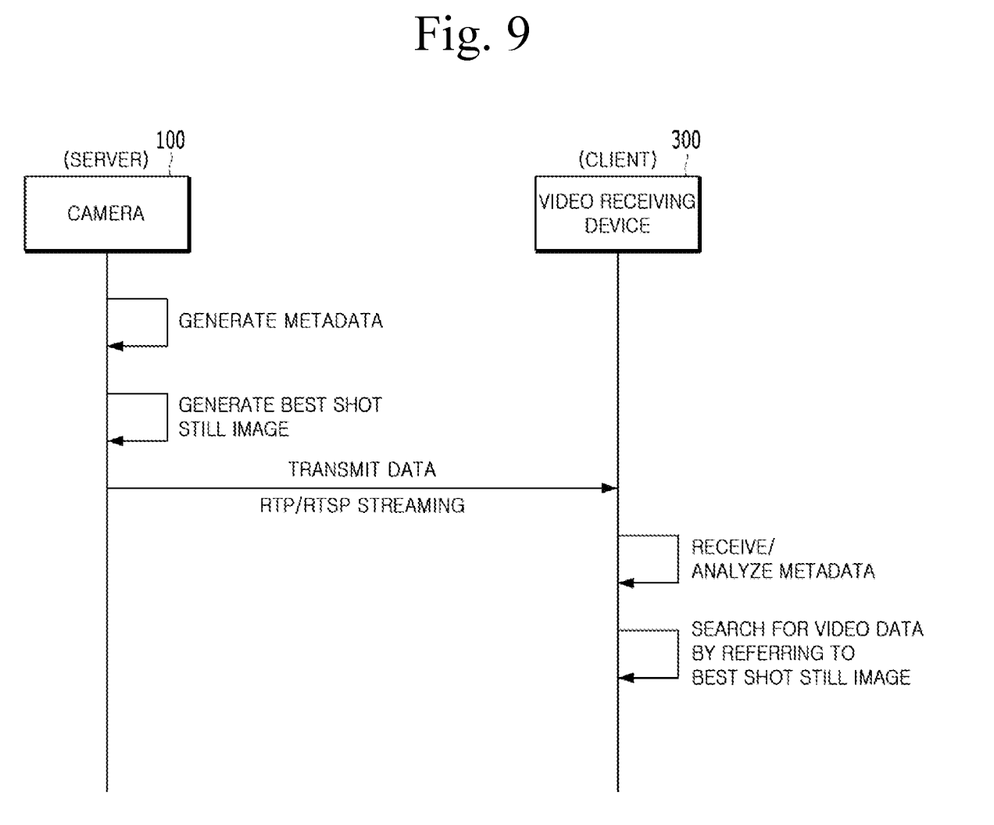
FIG. 9 is a diagram illustrating a method of operating a network surveillance camera system according to an embodiment of the present invention.

As described above, if the attribute information is further included in the RTP extension header 1020 in addition to the object ID, additional video analysis functions can be implemented by selecting the attribute information in a client (e.g., video receiving device 300) side. FIG. 9 is a diagram illustrating a method of operating a network surveillance camera system according to an embodiment of the present invention. A method for operating a network surveillance camera system according to an embodiment of the present invention will be described with reference to FIGS. 1 to 9.

A network surveillance camera system according to an embodiment of the present invention comprises the camera 100 for photographing a surveillance region to acquire a video and audio signal for the surveillance region, and a video receiving device 300 for receiving data transmitted by the camera 100 and storing and monitoring it. That is, in the embodiment of the present invention, the camera 100 may serve as a server transmitting data, and the video receiving device 300 may serve as a client receiving the transmitted data.

The camera 100 may be implemented as a network camera that performs an intelligent video analysis function. Accordingly, the camera 100 according to the embodiment of the present invention may generate the video analysis information corresponding to the surveillance region in the form of text-based metadata. For example, the metadata may be written in an XML format.

In the case of an embodiment of the present invention, the video analysis function of the camera 100 may be set through a protocol such as the HTTP interface provided by the camera 100, and the value set at this time may be a surveillance region for video analysis, a type of identification target, and the like. As an example, it may be the coordinate information of the surveillance region, the type of an object to be video analyzed (e.g., car, person, bag, etc.), and the setting/confirmation of an object type analyzed as metadata.

The metadata may be generated in the form of text-based metadata, which may be written in, for example, an XML format. The metadata may include object detection information (movement, sound, intrusion into a designated area, etc.) and object identification information (person, car, face, hat, clothes, etc.) photographed in the surveillance region, and detected location information (coordinates, size, etc.).

While generating the text-based metadata, it is possible to capture and generate a still image for a specific analysis region among the video analysis information. For example, the still image may be generated by cropping a specific region of the video data determined to be an identifiable object among the video data of the surveillance region detected for a specific region and a specific period, and it may be implemented as a JPEG image file.

The object that is the target of the still image may correspond to the type of object included in the video analysis function of the camera 100 previously set. More specifically, the still image may be a still image generated by cropping a specific region, that is, a video portion corresponding to an object detected within the surveillance region, among the video analysis information corresponding to the surveillance region written in the text-based metadata. That is, it may be selected as a "best shot" still image capable of recognizing a specific object best among the video data photographed in the surveillance region.

In the embodiment of the present invention, in addition to the video data and audio data for the surveillance region photographed by the camera 100, the above-described metadata and the corresponding still image are transmitted together to the client, that is, the video receiving device 300 in real time.

As an example, referring to FIG. 7, when the client adds Require: Best Shot and transmits it in the step of sending the RTSP DESCRIBE instruction to the server, in this case, the RTSP server providing the above-described still image (e.g., Best Shot) generation and provision function can transmit metadata and the corresponding still image to the client in addition to video data/audio data.

At this time, referring to FIG. 8, the RTP header according to the embodiment of the present invention includes the RTP extension header 1020 in addition to the RTP fixed header 1010 conforming to the RTSP standard, and the RTP extension header 1020 includes an extension header ID and an object ID.

Referring to FIG. 8, the extension header ID is "0xFFDD," which is a header code for analyzing the still image syntax in the client. In addition, the object ID represents the identifier of the video analysis object described in the metadata written in XML.

Thereafter, as a client, the video receiving device 300 may receive data transmitted from the camera 100 in real time, analyze and monitor it, and for example, the video receiving device 300 may be implemented as a DVR (Digital Video Recorder), NVR (Network Video Recorder), VMS (Video Management System), etc., or as an application installed in a mobile terminal.

First, the video receiving device 300 receives the transmitted text-based metadata, and such metadata is transmitted together with the video and audio signals detected in the surveillance region to the video receiving device 300 through the network 200 in real time, and can be used for real-time control and video search to increase control convenience and search efficiency.

Similarly, the video receiving device 300 receives the transmitted still image, and the still image may be a still image generated by cropping a specific region, that is, a video portion corresponding to an identifiable object detected within the surveillance region, among the video analysis information corresponding to the surveillance region written in the text-based metadata. That is, it may be selected as a "best shot" still image capable of recognizing a specific object best among the video data photographed in the surveillance region.

In addition, the video receiving device 300 may generate a thumbnail image by using the still image and displays it when searching for video data corresponding to the surveillance region transmitted by the camera 200, so that the image can be used to play back the transmitted video data of the surveillance area. More specifically, the video analysis information transmitted in the form of text-based metadata is displayed based on the surveillance region, and the "Best Shot" still image corresponding to the metadata information may be displayed as a thumbnail image.

Through this, the client, such as a video receiving device, can efficiently use the client's resources by using the still image as the thumbnail image without performing a separate video decoding procedure, and as a result, the video data in the surveillance region can be more quickly and accurately searched.

As described above, in the present invention, specific matters such as specific components, etc., and limited embodiments and drawings have been described, but these are only provided to help a more general understanding of the present invention, and the present invention is not limited to the above embodiments, and various modifications and variations are possible from these descriptions by those skilled in the art, to which the present invention pertains.

Therefore, the spirit of the present invention should not be limited to the described embodiments, and not only the claims described below, but also all equivalents or equivalent modifications to the claims belong to the scope of the spirit of the present invention.

According to this embodiment of the present invention, by providing a still image of an identifiable specific region among the video analysis information for the surveillance region, a client, such as a video receiving device, can search for the video data of the surveillance region more quickly and accurately by using the image information without performing a separate video decoding procedure.

In addition, when a client requests a video through the RTP/RTSP streaming protocol, the video analysis information implemented as text-based metadata by extending the existing RTP/RTSP streaming protocol and still images for the specific analysis region can be transmitted in real time in addition to the video/audio signal for the surveillance region.

What is claimed is:

1. A network surveillance camera system comprising:
a camera configured to photograph a surveillance region to acquire video and audio signals for the surveillance region; and
a video receiving device connected to the camera through network for receiving data from the camera in real time,
wherein the camera comprises at least one processor configured to implement;
a metadata generation unit configured to generate video analysis information corresponding to the surveillance region as metadata; and
a still image generation unit configured to generate a still image by cropping a video portion corresponding to an object detected within the surveillance region from among the video analysis information,
wherein the camera is configured to generate the metadata and the still image having mapping relationship,
wherein the metadata comprises identification information about the object which is photographed in the surveillance region and comprises information about a type of the object, and
wherein the video receiving device is configured to generate the still image as a thumbnail image in response to a search request.

2. The system of claim 1, wherein real time transmission of the data is implemented by an RTP/RTSP streaming protocol.

3. The system of claim 2, wherein an RTP header of the data transmitted in real time includes an RTP fixed header and an RTP extension header.

4. The system of claim 3, wherein the RTP extension header includes an extension header identifier (ID) and an object ID for the detected object, and wherein the object ID is an identifier of a video analysis object described in the metadata.

5. The system of claim 4, wherein the at least one processor is configured to generate the metadata indicating whether the object is one of a person, a vehicle, a face, and a license plate.

6. The system of claim 4, wherein the RTP extension header further includes an extension field including coordinate information, at which the detected object is located in a corresponding original video region, and/or attribute information indicating an attribute of the detected object.

7. The system of claim 1, wherein the metadata further includes detection information of the object and location information of the object.

8. A method for operating a network surveillance camera system comprising:
acquiring a video/audio signal for a surveillance region, by a camera, by photographing the surveillance region;
generating video analysis information corresponding to the surveillance region as text-based metadata;
generating a still image, by the camera, by cropping a video portion corresponding to an object detected within the surveillance region among the video analysis information;
transmitting, by the camera, the video/audio signal, metadata, and still image in real time by an RTP/RTSP streaming protocol; and
monitoring the surveillance region, by a video receiving device, by receiving the video/audio signal, metadata, and still image,
wherein the camera generates the metadata and the still image mapping relationship,
wherein the metadata comprises identification information about the object which is photographed in the surveillance region and comprises information about a type of the object, and
wherein the still image is used as a thumbnail image in response to a search request.

9. The method of claim 8, wherein an RTP header of the data transmitted in real time includes an RTP fixed header and an RTP extension header.

10. The method of claim 9, wherein the RTP extension header includes an extension header identifier (ID) and an object ID for the detected object, and
wherein the object ID is an identifier of a video analysis object described in the metadata.

11. The method of claim 10, further comprising generating, by the camera system, the metadata indicating whether the object is one of a person, a vehicle, a face, and a license plate.

12. The method of claim 10, wherein the RTP extension header further includes an extension field including coordinate information, at which the detected object is located in a corresponding original video region, and/or an attribute information indicating an attribute of the detected object.

13. The method of claim 8, wherein the metadata further includes detection information of the object and location information of the object.

14. A network surveillance apparatus and a server comprising:
the server;
an image sensor, of the network surveillance apparatus, configured to photograph a surveillance region to acquire video;
a processor, of the network surveillance apparatus, configured to generate metadata and a still image by cropping a video portion corresponding to an object detected within the surveillance region based on video analysis information corresponding to the surveillance region;
a communication interface, of the network surveillance apparatus, configured to transmit data comprising the video, the metadata and the still image in real time from the network surveillance apparatus to the server,
wherein the processor is configured to generate the metadata and the still image having mapping relationship,
wherein the metadata comprises identification information about the object which is photographed in the surveillance region and comprises information about a type of the object.

15. The system of claim 14, wherein real time transmission of the data is implemented by an RTP/RTSP streaming protocol.

16. The system of claim 15, wherein an RTP header of the data transmitted in real time includes an RTP fixed header and an RTP extension header.

17. The apparatus of claim 16, wherein the RTP extension header includes an extension header identifier (ID) and an object ID for the detected object, and Wherein the object ID is an identifier of a video analysis object described in the metadata.

18. The apparatus of claim 17, wherein the processor is configured to generate the metadata indicating whether the object is one of a person, a vehicle, a face, and a license plate.

19. The apparatus of claim 17, wherein the RTP extension header further includes an extension field including coordinate information, at which the detected object is located in a corresponding original video region, and/or attribute information indicating an attribute of the detected object.

20. The apparatus of claim 14, wherein the metadata further includes detection information of the object and location information of the object.

\* \* \* \* \*